US006826764B2

(12) United States Patent
Fujisawa

(10) Patent No.: US 6,826,764 B2
(45) Date of Patent: Nov. 30, 2004

(54) DISC DEVICE WITH SELF-HOLD SOLENOID IN EJECT/LOCK MECHANISM

(75) Inventor: Shinichi Fujisawa, Tokyo (JP)

(73) Assignee: TEAC Corporation, Tokyo (JP)

( * ) Notice: Subject to any disclaimer, the term of this patent is extended or adjusted under 35 U.S.C. 154(b) by 231 days.

(21) Appl. No.: 10/064,523

(22) Filed: Jul. 24, 2002

(65) Prior Publication Data

US 2003/0043720 A1 Mar. 6, 2003

(30) Foreign Application Priority Data

Sep. 4, 2001 (JP) .......................................... 2001-267145
Sep. 4, 2001 (JP) .......................................... 2001-267149

(51) Int. Cl.[7] .......................... G11B 17/03; G11B 17/04; G11B 33/02
(52) U.S. Cl. ........................................ 720/610; 720/601
(58) Field of Search ................................. 720/610, 600, 720/601, 636, 637, 647, 655, 657; 369/30.84, 75.11; 312/9.19; 360/99.02, 99.06, 99.07, 99.03

(56) References Cited

FOREIGN PATENT DOCUMENTS

| JP | 6-68572 A1 | * | 3/1994 |
|----|----|----|----|
| JP | 09-044955 | | 2/1997 |
| JP | 11-339354 | | 12/1999 |
| JP | 2001-126460 | | 5/2001 |

* cited by examiner

*Primary Examiner*—Julie Anne Watko
(74) *Attorney, Agent, or Firm*—Jiang Chyun IP Office

(57) ABSTRACT

A disc device can easily install an eject/lock mechanism of self-hold solenoid type into a narrow space inside it, and by omitting some mechanisms of the structures, the cost can be lowered, and the malfunction frequency is therefore reduced. The disc device operates the eject/lock mechanism and opens a disc-loading unit by adding a pulse current to the self-hold solenoid. The eject/lock mechanism has a releasing spring, and when closing the disc-loading unit, a resilient force is generated by the releasing spring, and when opening the disc-loading unit, the resilient force is released. An activating end of the releasing spring is connected to a moveable plate of the self-hold solenoid.

13 Claims, 10 Drawing Sheets

DISC DEVICE WITH SELF-HOLD SOLENOID IN EJECT/LOCK MECHANISM

CROSS REFERENCE TO RELATED APPLICATIONS

This application claims the priority benefit of Japanese application serial No.2001-267145 filed on Sep. 4, 2001 and 2001-267149 filed on Sep. 4, 2001.

BACKGROUND OF INVENTION

1. Field of the Invention

This invention relates in general to a disc device for driving CD-R/RW or DVD-R/RW discs in various computer systems.

2. Description of Related Art

Generally speaking, a disc device for driving an optic disc is necessary in order to record or reproduce data to or from a personal computer (PC, hereinafter). The disc device can be built inside the PC or be externally connected to the PC by a cable.

The disc device built inside a PC is a drawer type disc device. The drawer for receiving a disc can be drawn out to load an optical disc by a drawer switch or a command from the PC. On the other hand, an upper lid type disc device, which is connected externally to the PC with a cable, is widely used from the music CD player to the PC due to its convenience.

The disc device for a computer can function as an editing program, editing video images and music, and then recording these data onto a disc. Data like these should be completely recorded without interruption because they are serially systematized data. Furthermore, when the mechanism for ejecting the optical disc is operated, if the data recording is in progress, there is a danger of forcing the recording to finish.

Here, an eject/lock mechanism is proposed for any one of the drawer type and upper lid type, wherein the disc cannot be manually ejected when the recording is continuing. As the optical disc becomes capable of ejecting and loading, the microcomputer inside the disc drive judges the situation to drive the eject/lock mechanism that is formed with electrical and mechanical elements according to an ejection request. In this way, manual operations during the recording are rejected to increase the recording safety.

For achieving the above object, the eject/lock mechanism can be a type of electric motor for instance, which is disclosed by Japanese Laid-Open no. 2001-126460, entitled "Device for Loading a Recording Medium". An electric motor is used as a power, and a transferring mechanism with a main body formed of gears is used to transfer the power of the motor, wherein the motor is controlled by signals from the microcomputer inside the PC. Because the transferring mechanism that has many motors and parts is used in this motor type disc device, the manufacturing cost is high, and a recovering mechanism is required when power goes down. Also a wider space is required for installing a variety of parts of the motor and transferring mechanism.

Additionally, an attraction solenoid type eject/lock mechanism is disclosed by Japanese Laid-Open no. He9-44955, entitled "Disc Device". An attraction solenoid is used as a power to eject or lock a disc by operating a lock lever with horizontal movements of a plunger of the eject/lock mechanism. In this attraction solenoid type eject/lock mechanism, the efficiency of the attraction is low with respect to the volume of the attraction solenoid, and a large current is required during its operation. Furthermore, the movable part (iron core) has a large weight and therefore the impact-resistance is low, so that the lock might be released because of the impact during transportation.

Furthermore, a self-hold solenoid type eject/lock mechanism is disclosed by Japanese Laid-Open no. He11-339354, entitled "Disc Device". A self-hold solenoid is used as a power. Lock levers moving together with a movable plate of the self-hold solenoid are operated to control the ejection and the lock of a disc. In comparison with the motor type and the attraction solenoid type, the self-hold solenoid type can be further simplified, and the manufacturing cost is relatively low.

From the point of simple structures, low cost, space saving and low power consumption, the self-hold solenoid type of the eject/lock mechanism is highly superior to the other two types. The volume capable of assembling a disc device into a PC becomes smaller due to the main body of PC becoming smaller and lighter, especially as a flat shape is required for the notebook PC. And the volume for assembling the eject/lock mechanism becomes narrower due to the upper lid type disc device becoming miniaturized. Therefore, an eject/lock mechanism with a simplified structure is required.

A precise handwork is needed because the eject/lock mechanism is to be installed in a narrow part of the disc device, and the installation process is very complicated. It is especially difficult to use the flexible print circuits (FPC) etc to connect the magnetization coil and the printed board for supplying a pulse current to the magnetization coil of the self-hold solenoid, because the printed board and magnetization coil are close to each other.

Therefore it is difficult to construct an eject/lock mechanism using the motor type or attraction solenoid type, and even using the self-hold solenoid type, the structures thereof should be as simplified as possible.

SUMMARY OF INVENTION

The present invention is focused on solving the problems described above. A disc device is provided of self-hold solenoid type, wherein an eject/lock mechanism is installed in a narrow space inside the disc device in a space-saving way, and by eliminating structural elements, the manufacturing cost and the malfunction rate of the disc device is reduced and the reliability thereof is increased.

For solving the related problems, the present invention lifts the rationality of installing the eject/lock mechanism to the disc device by eliminating complicated mounting steps of a printed board and a terminal of a magnetization coil of a self-hold solenoid.

According to the foregoing description, the present invention solves the problems described above with devices provided as follows.

The invention provides a disc device, which comprises an eject/lock mechanism, activated by applying a pulse current to a self-hold solenoid, for opening a discloading unit; and a releasing spring, engaged with the eject/lock mechanism, for creating a resilient force when the disc-loading unit is closed, and for releasing the resilient force when the disc-loading unit is opened. An activating end of the releasing spring is connected to a moveable plate of the self-hold solenoid disc-loading unit.

The invention further provides a disc device, which comprises an eject/lock mechanism, activated by applying a pulse current to a self-hold solenoid, for opening a disc-loading unit. The eject/lock mechanism further comprises a first slider, having a releasing spring wherein the releasing spring is connected to a moveable plate of the self-hold solenoid for creating a resilient force by a first fixing claw of an upper lid when the upper lid of the disc-loading unit is closed, and for releasing the resilient force when the upper lid of the disc-loading unit is opened; and a second slider having a second fixing claw The second fixing claw engages the first fixing claw of the upper lid, and the second slider is actuated in a direction for maintaining an engagement of the second fixing claw, and then the engagement is released by moving the second slider together with the first slider.

In addition, the invention also provides a disc device, comprising an eject/lock mechanism, activated by applying a pulse current to a self-hold solenoid, for opening a disc-loading unit. The eject/lock mechanism further comprises a lock lever, having a latching unit. The latching unit moves together with a moveable plate of the self-hold solenoid, and the latching unit is latched by a lock pin; and a releasing spring, for creating a resilient force by stretching the moveable plate of the self-hold solenoid when a drawer is closed, and for releasing the resilient force when the drawer is open.

In the disc devices described above, the resilient force of the releasing spring is smaller than a holding force of the moveable plate of the self-hold solenoid.

In the disc devices described above, a terminal end of a magnetization coil of the self-hold solenoid is exposed to a circuit face of a printed board that covers the eject/lock mechanism, so that the terminal end is connected to a circuit of the printed board where the pulse current is applied.

The invention further provides a disc device, which comprises an eject/lock mechanism, activated by applying a pulse current to a self-hold solenoid, for opening a disc-loading unit, wherein a terminal end of a magnetization coil of the self-hold solenoid is exposed to a circuit face of a printed board that covers the eject/lock mechanism, so that the terminal end is connected to a circuit of the printed board where the pulse current is applied.

In the devices described above, the printed board is disposed so as to support parts of the eject/lock mechanism.

BRIEF DESCRIPTION OF DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DETAILED DESCRIPTION

Figure 1:
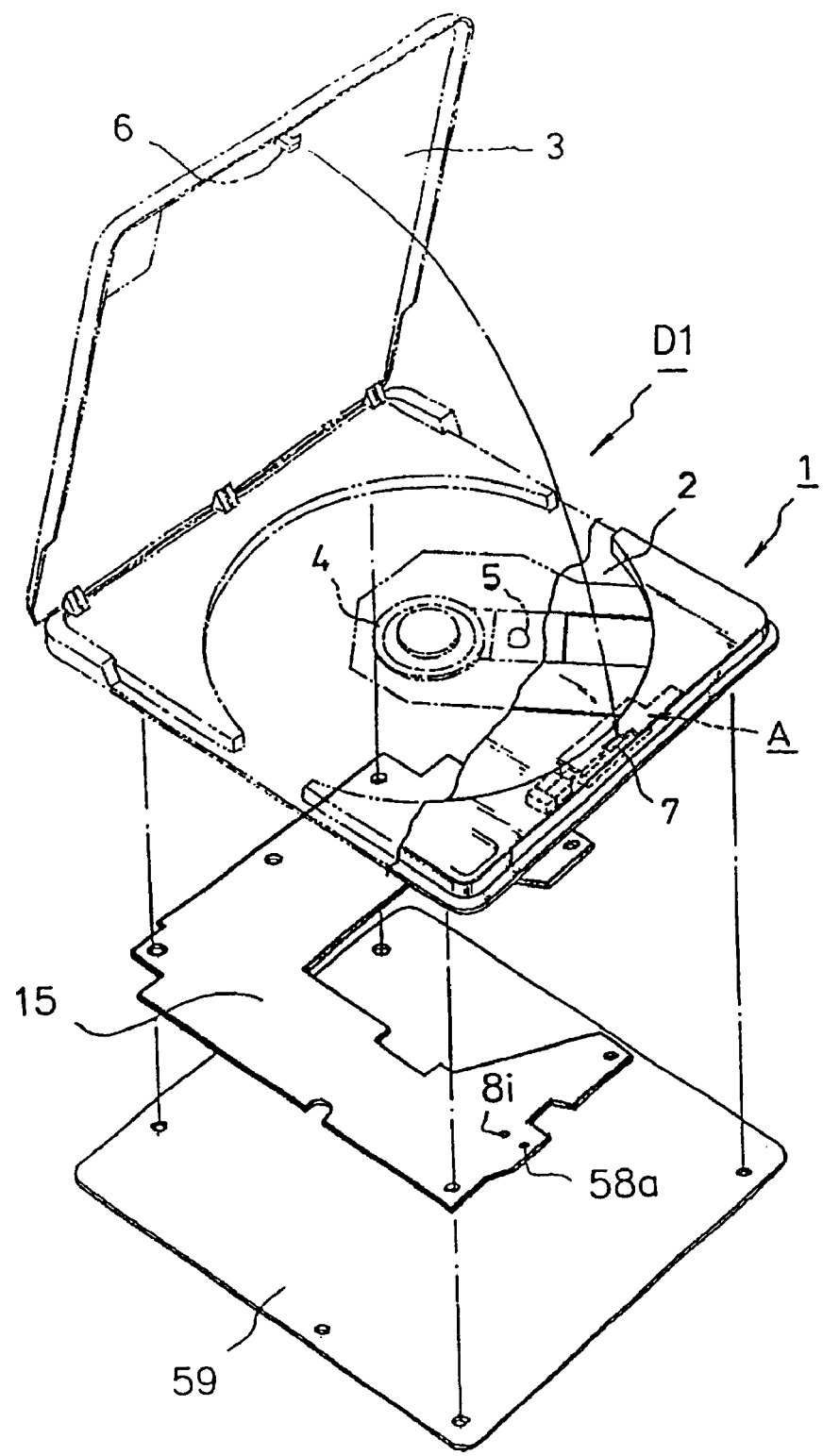
FIG. 1 is a perspective view showing an upper lid type disc device suitable for the present invention.

The embodiments of the present invention will be explained in detail as follows. FIG. 1 is a perspective view showing a disc device D1 of upper lid type (portable type) according to the first embodiment of the present invention. The disc device D1 can use a cable (not shown) to connect to a personal computer (PC).

The disc device D1 comprises an entity 1, a disc loading unit 2 formed on the entity for receiving an optical disc (a recording medium, such as a CD-R/RW, a DVDR/RW, etc.), and an upper lid 3, which form the main body of the disc device D1. A turntable 4 for rotatably driving the optical disc at the central position of the disc loading unit 2, and a pick up 5 capable of moving along the radial direction of the optical disc, are installed in the disc device D1.

A fixing claw 6 is integrally formed with the upper lid 3 in order to close the upper lid 3 onto the entity 1. A through hole 7 for allowing the fixing claw 6 to insert into the entity 1 is formed opposite to the fixing claw 6 on the entity 1. An eject/lock mechanism A is disposed inside the entity 1 at a place corresponding to the through hole 7. A printed board 15 which packs electronic parts such as integrated circuits (IC) and a bottom plate 59 covering a bottom of the entity 1 are further arranged in the entity 1.

Figure 2:
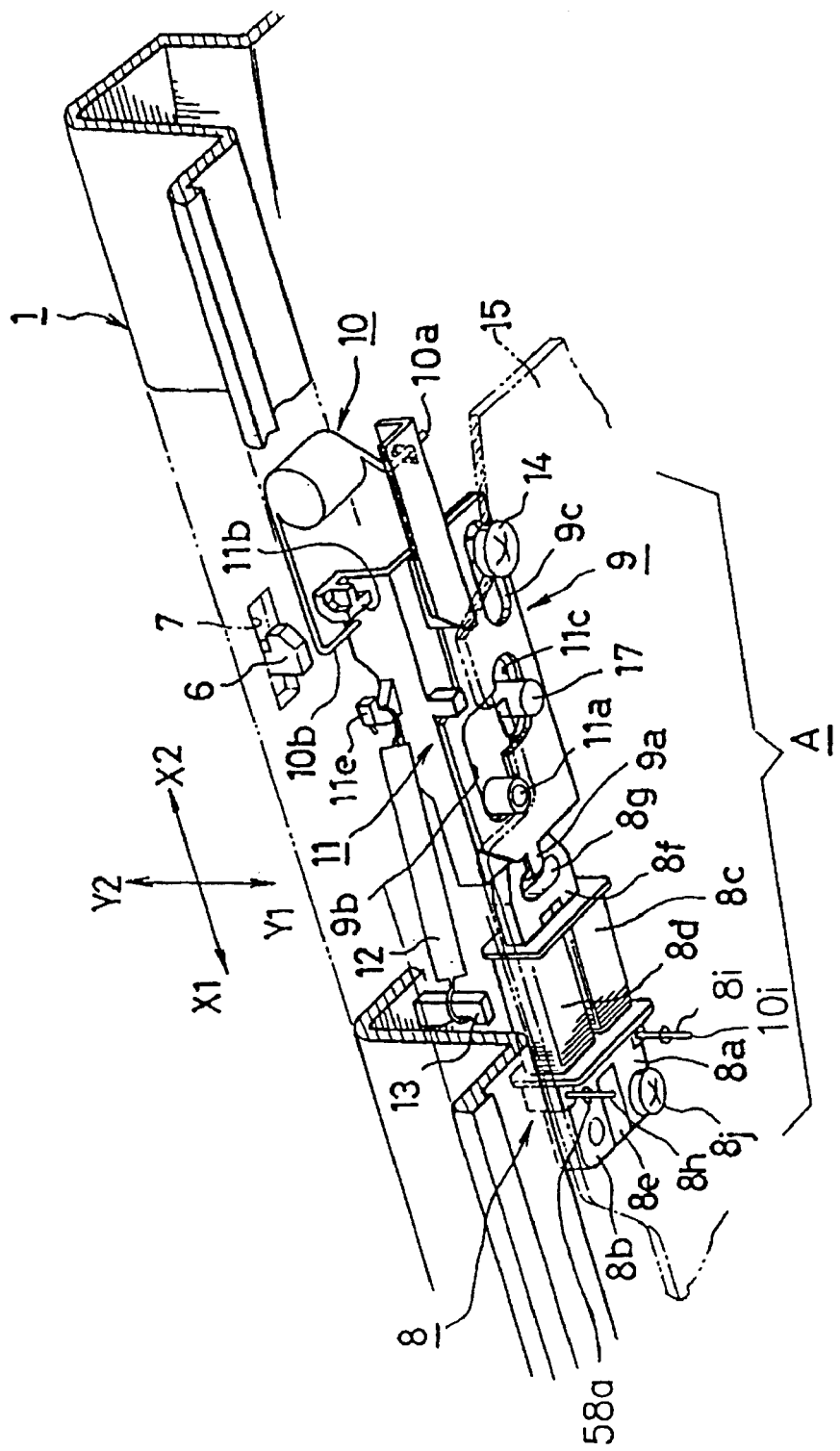
FIG. 2 is a perspective view according to the first embodiment of the present embodiment.
Figure 3:
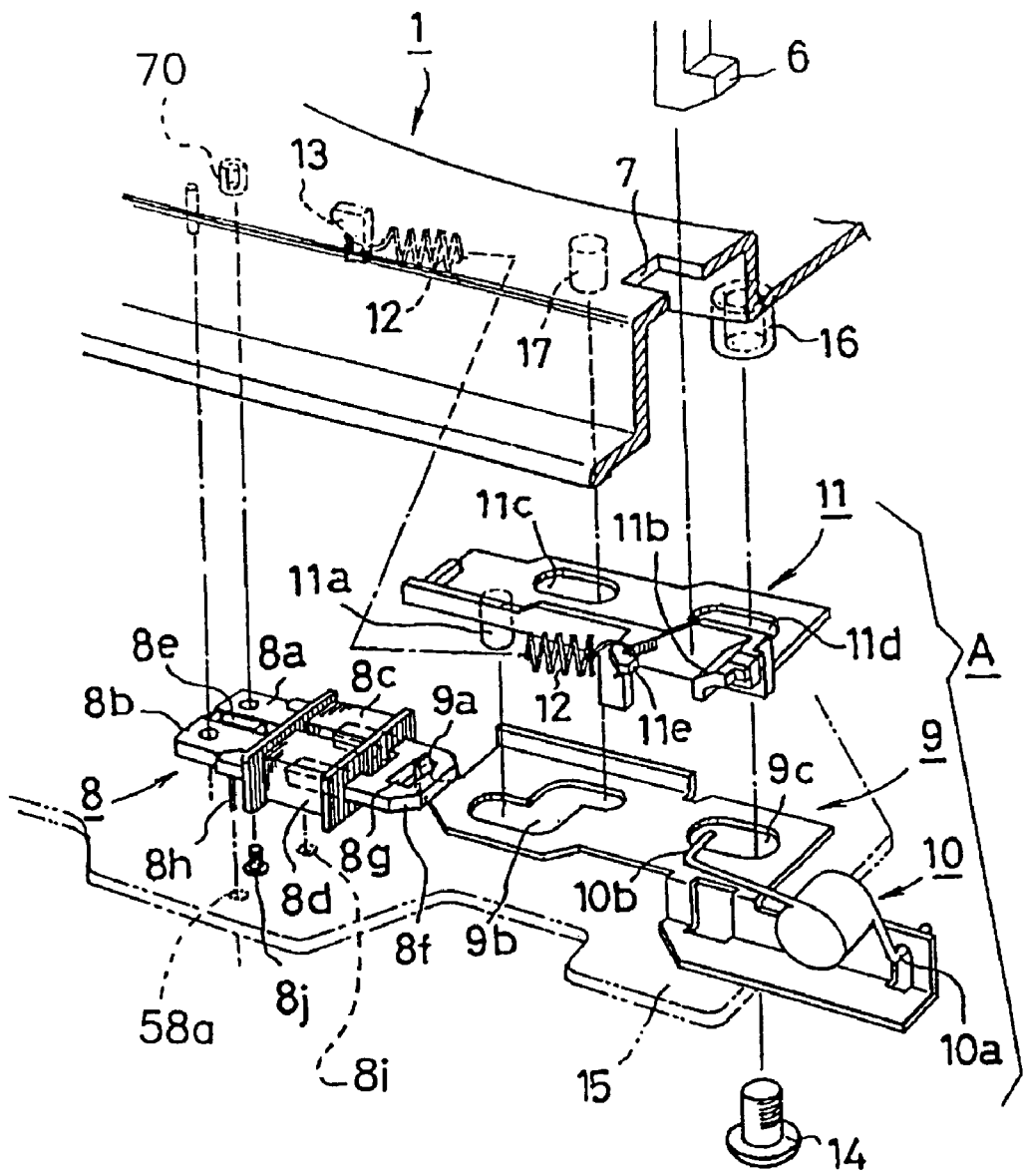
FIG. 3 is an explosive view of FIG. 2.

FIG. 2 and FIG. 3 are perspective views showing the eject/lock mechanism A according to the first embodiment.

A self-hold solenoid 8 serves as a driving source. Tips of a pair of yokes 8a, 8b are respectively inserted from one end of each of the magnetization coils 8c, 8d to substantially fix to the central portion of the magnetization coils 8c, 8d. A permanent magnet 8e is disposed between the yokes 8a, 8b to form a magnetic circuit with a horseshoe shape. On the other hand, an open end of a moveable plate 8f (a magnetic material) is slidably inserted to the other ends of the magnetization coils 8c, 8d. Therefore, under usual conditions, the moveable plate 8f is attracted by a magnetic force generated by the magnetic circuit formed by the permanent magnet 8e. A direct current flows from terminals 8h, 10i at the ends of the magnetization coils 8c, 8d to generate a magnetic field opposite to that generated by the permanent magnetic 8e. In this way, the magnetic field generated by the permanent magnet 8e can be eliminated to release the restraint of the moveable plate 8f. The self-hold solenoid 8 is fixed on the entity 1 by a screw 8j as shown in FIG. 2.

A front end 9a of the first slider 9 connects to a connecting hole 8g of the moveable plate 8f of the self-hold solenoid 8 and moves together with the moveable plate 8f. An activating end 10a of a releasing spring 10 engages to a rear end of the first slider 9, and a resilient force is generated on a free end 10b of the releasing spring 10 when the fixing claw 6 of the upper lid 3 is pressed. The force of the releasing spring 10 has to be smaller than the force for magnetically attracting the self-hold solenoid 8. The body of the releasing spring 10 is fixed on a supporting body by suitable instruments such as screws. Guide holes 9b, 9c are formed on the body of the first slider 9 in order that the first slider 9 can move together with a second slider 11 which will be described later, or the second slider 11 can move alone.

The second slider 11 is tightly in contact with the first slider 9, so that the second slider 11 is slidably installed on the first slider 9. The second slider 11 has a guide pin 11a capable of movably embedding to the guide hole 9b and has a fixing claw 11b for engaging the fixing claw 6 of the upper lid 3. Guide holes 11c, 11d are formed on the second slider 11. One end of a resilient spring 12 is hung on a hook 11e formed on a side portion of the second slider 11, and the other end of the resilient spring 12 is hung on a hook 13 formed on the entity 1. In this way, the second slider 11 is actuated toward the self-hold solenoid 8.

As shown in FIGS. 2 and 3, when the printed board 15 together with the first and second slider 9, 11 are slidably installed by a screw 14 to a screw-receiver boss 16 formed on the entity 1, the guide pin 11a is movably embedded to the guide hole 9b, and a guide pin 17 formed on the entity 1 is movably embedded to the guide hole 11c of the second slider 11 and the guide hole 9b of the first slider 9. Yokes of the self-hold solenoid 8 are fixed by the screw 8j onto a screw-receiver boss 70 formed on the entity 1.

As described above, at the status of the eject/lock mechanism A shown in FIG. 1, i.e., during closing the upper lid 3, the free end 10b of the releasing spring is not yet pressed by the fixing claw 6, and no resilient force is generated on the free end 10b, so the releasing spring 10 won't affect the first slider 9. On the other hand, the second slider 11 is extended by the resilient spring 12 toward the arrow X1 direction, and the first slider 9 is also extended at the same time due to the guide pin 11a.

When continuously closing the upper lid 3, the head of the fixing claw 6 presses the free end 10b of the releasing spring 10, and the fixing claw 6 is in contact with an inclined plane of the fixing claw 11b. In this way, the second slider 11 slides toward the arrow X2 direction. At this time, even though a resilient force of the releasing spring 10 grows slowly, the first slider 9 will maintain its status and only the second slider 11 slides because the moveable plate 8f is strongly attracted on the self-hold solenoid 8

Figure 4A:
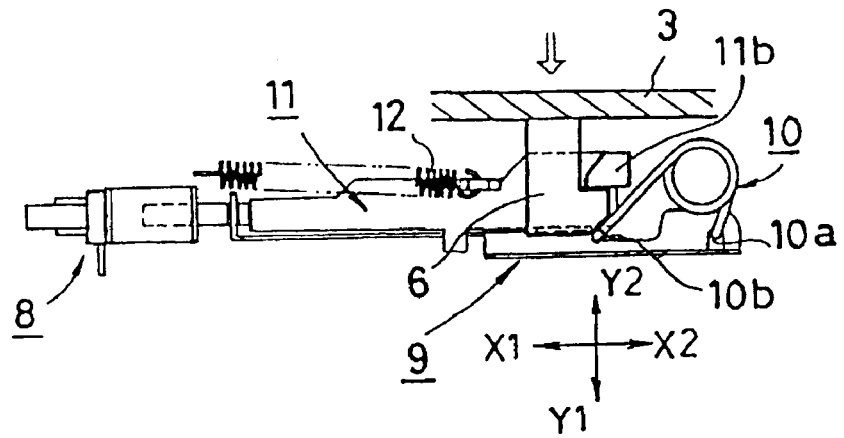
FIGS. 4A–4C are diagrams for explaining the operation according to the first embodiment according of the present invention.

When the fixing claw 6 is further pressed (toward the arrow Y1 direction) and is separated from the inclined plane of the fixing claw 11b, palates of the fixing claw 6 and 11b will engage to each other as shown in FIG. 4A, and the upper lid 3 is completely locked. At this time, the releasing spring 10 is pressed to the utmost by the fixing claw 6, and the resilient force generated by the releasing spring 10 makes the first slider 9 slide toward the arrow X2 direction, and press the fixing claw 6 upward (Y2 direction). At this time, the resilient force actuating toward X2 direction generated by the releasing spring 10 is larger than the resilient force actuating toward X1 direction generated by the resilient spring 12.

Figure 4B:
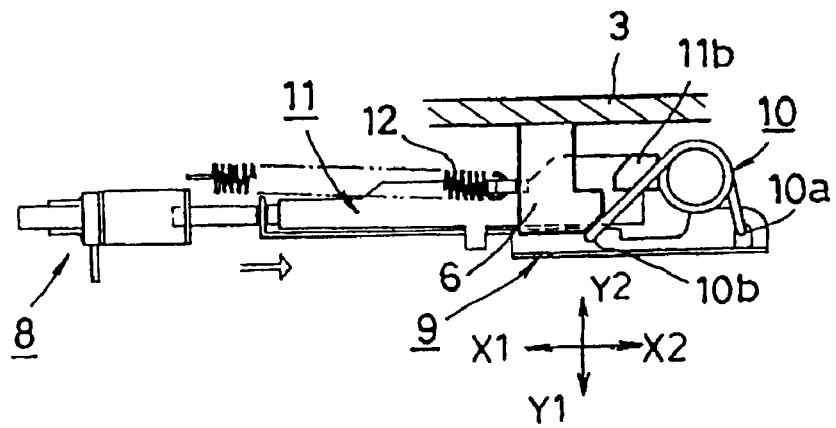
Figure 4C:
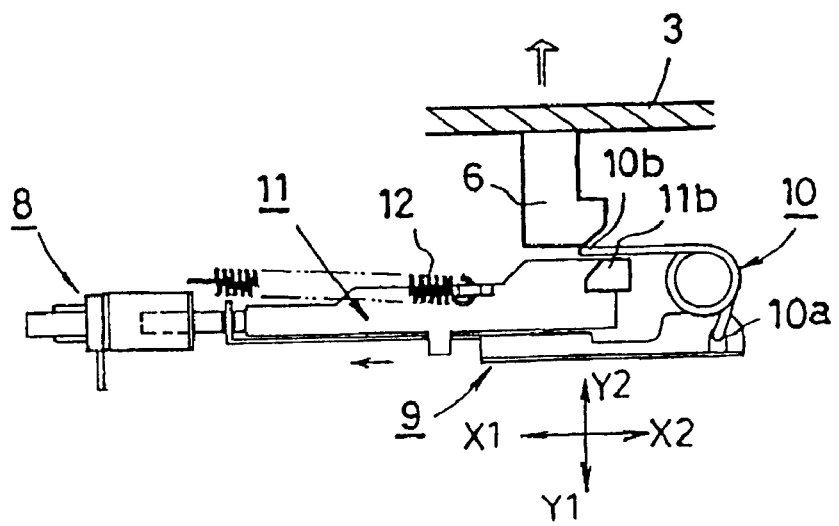

When ejecting the upper lid 3 under a condition that the upper lid 3 is locked as described above, a pulse current, according to an ejecting switch (not shown) disposed on the entity 1 or according to a command from a PC, is applied to the magnetization coils 8c, 8d of the self-hold solenoid 8. The magnetic field of the permanent magnet 8e generated on the yokes 8a, 8b can be eliminated immediately. Therefore, the resilient force (larger than that of the resilient spring 12) of the releasing spring 10 will affect the first slider 9 to instantly move toward the X2 direction as shown in FIG. 4B. Because the guide pin 11a of the second slider 11 engages the guide hole 9b, the second slider 11 moves together with the first slider 9 at the same time. Then the fixing claw 11b moves toward the X2 direction, and releases the engagement with the fixing claw 6.a1a1. At this time, the remaining resilient force of the releasing spring 10 and a resilient force of a spring (not shown) actuating the upper lid 3 in the lifting direction will press the fixing claw 6 to lift as shown in FIG. 4C, so that the upper lid 3 can be lifted. When the upper lid 3 is lifted, the resilient force of the releasing spring 10 is released by releasing the head of the fixing claw 6 from pressing on the free end 10b of the releasing spring 10, and thus the resilient force acting on the first slider 9 by the releasing spring 10 can be omitted. Because the resilient force of the releasing spring 10 toward the X2 direction is smaller than that of the resilient spring 12 toward the X1 direction, the second slider 11 will slide toward the X1 direction. Being pressed by the second slider 11, the first slider 9 and the moveable plate 8f will slide toward the X1 direction. Therefore, the moveable plate 8f is attracted to the self-hold solenoid and returns to the state of FIG. 2.

Referring to FIG. 2 and FIG. 3 shows the steps of installing the eject/lock mechanism A to the entity 1. First, before connecting the self-hold solenoid 8 to the printed board 15, the self-hold solenoid 8 is fixed onto the screw-receiver boss 70 formed on the entity 1 by a screw 8j. Then, parts of the first slider 9 and the second slider 11 etc., are disposed on the entity 1. At this time, the first slider 9 and the second slider 11 are not kept on the entity 1 yet.

After that, the printed board 15 is fixed onto the screw-receiver boss 16 formed on the entity 1 in a way such that an installing face thereof faces inside and a circuit face thereof faces outside. In this way, the printed board 15 is fixed on the entity 1. Then, the first slider 9 and the second slider 11 are clamped between the printed board 15 and the entity 1, and thus the first slider 9 and the second slider 11 are slidably kept on the entity 1. In other words, the printed board 15 serves as a supporting portion that keeps the first slider 9 and the second slider 11 capable of sliding.

Figure 10:
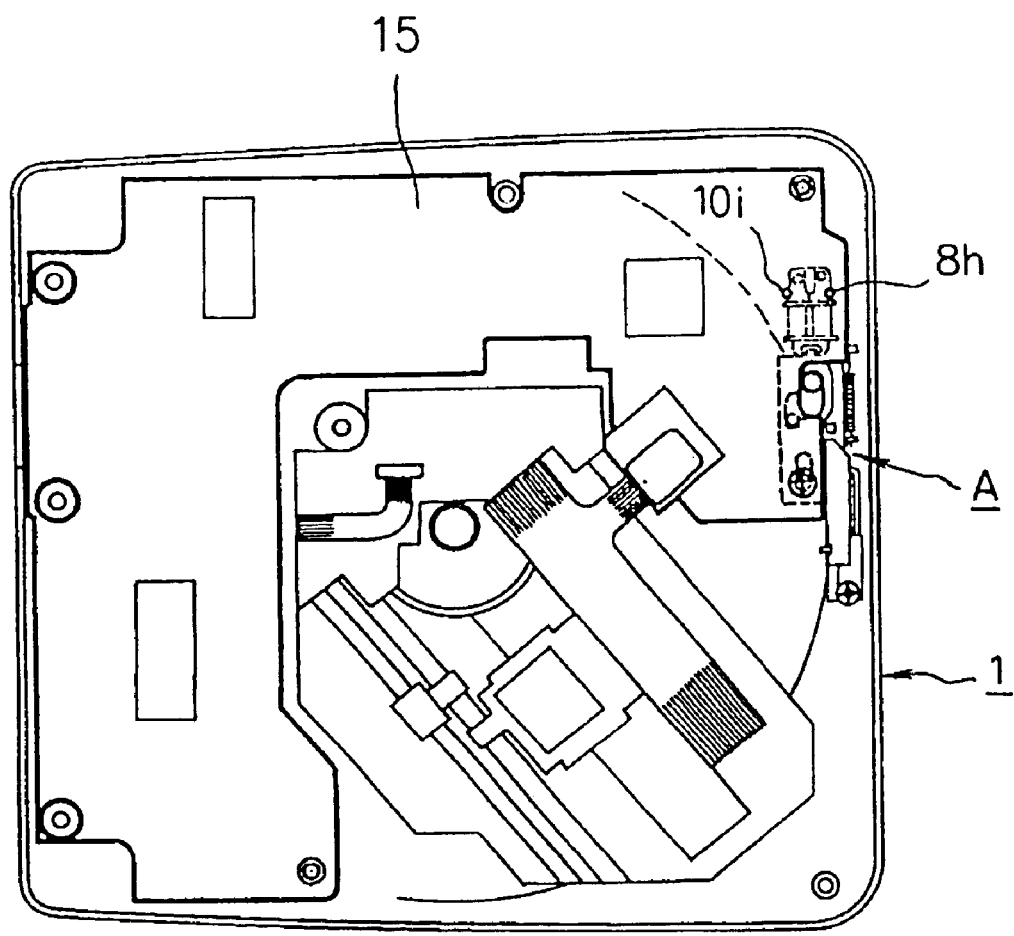
FIG. 10 shows the installation of a printed board to the entity of the disc device.

As described above, the eject/lock mechanism A is installed on the entity 1. Referring to FIG. 10, when the printed board 15 is disposed on the bottom of the entity 1, the terminals 8h, 10i will penetrate from the through holes 58a, 8i formed on the printed board 15 to the circuit face of the printed board 15. After that, the printed board which is formed in advance to surround the through holes 58a, 8i, and the terminals 8h, 10i are electrically connected by molding in order to form a circuit path towards the magnetization coils 8d, 8c.

After accomplishing the installation, the steps of taking out the printed board for maintenance are explained as follows. First, molding wires of the printed board 15 and the terminals 8h, 10i are removed, and the printed board 15 and the self-hold solenoid 8 are separated, and then the screw 14 is taken off. In this way, the printed board 15 can be taken out from the entity 1. At this time, the self-hold solenoid 8 is still fixed on the entity 1 by the screw 8j without being taken out from the entity 1.

Figure 5:
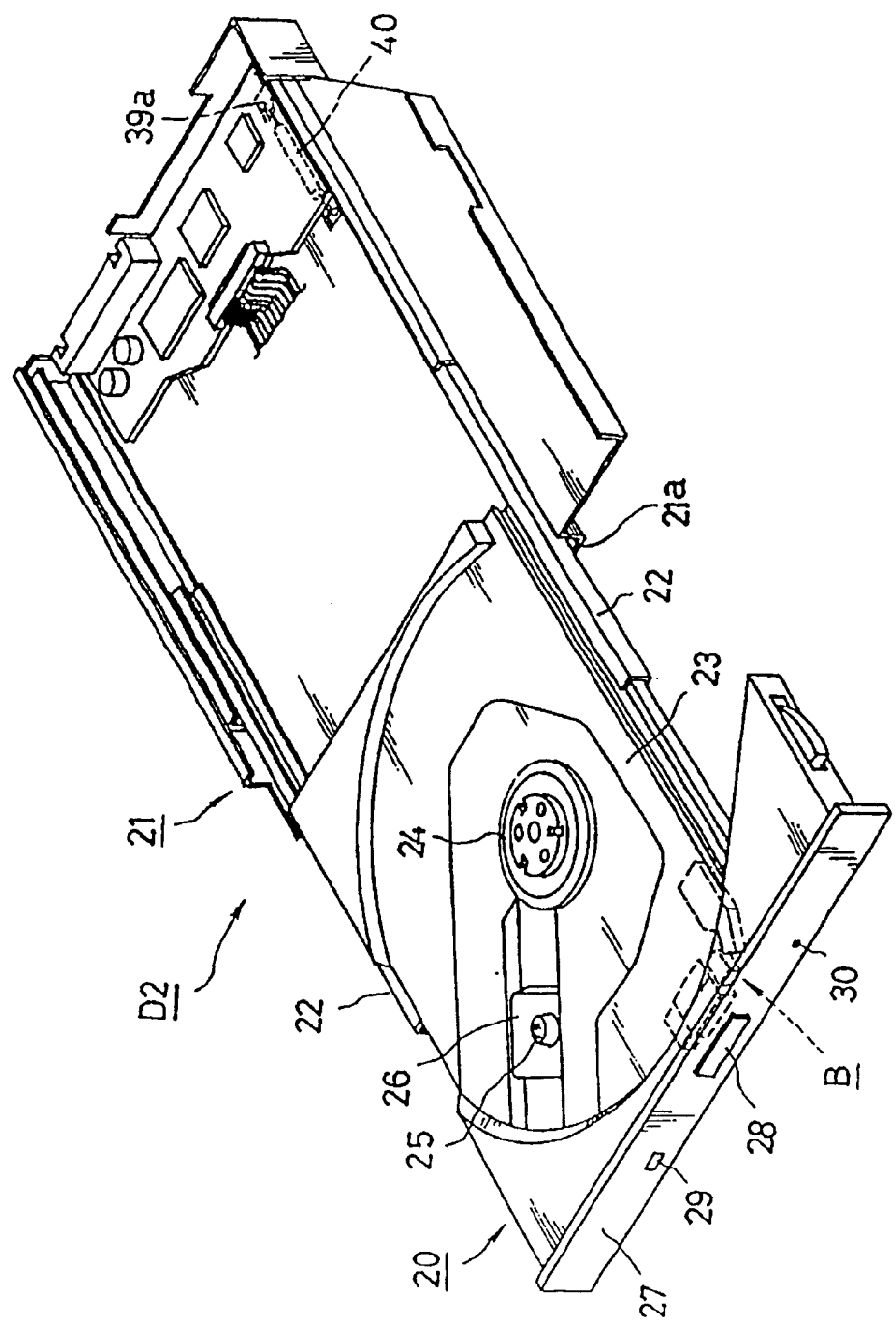
FIG. 5 is a perspective view showing a drawer type disc device suitable for the present invention.

The second embodiment applying the present invention suitable for a drawer type is explained in detail as follows. FIG. 5 is a perspective view showing the entire disc device built inside a notebook PC. A side portion of the drawer 20 is kept on a chassis 21 in a way that is capable of moving back and forth due to rails 22. The drawer 20 comprises a disc-loading unit 23 for receiving a disc, disc driving mechanisms such as a turntable 24 driven by a disc motor, a pickup 25 for reading data from the disc by irradiating a laser beam on the rotating disc and then receiving the reflecting beam, and a transporting mechanism 26 that moves the pickup 25 along a radial direction of the disc. A front panel of the drawer 20 has an eject switch 28 and an operation-confirming light unit 29, and a through hole 30 for compulsorily ejecting is formed on the front panel of the drawer 20.

An eject/load mechanism B that is installed in the disc device D2 is built in the drawer 20 behind the through hole 30 in a narrow portion, shown as a dotted line.

FIG. 6 to FIG. 9 are bottom views showing the eject/lock mechanism B according to the second embodiment, overlooking the bottom of the drawer 20, and show detailed explanations of the operating steps. The self-hold solenoid of the second embodiment has the same structure as that of the first embodiment. The specific explanations with respect to elements of same numbers are therefore omitted.

The yoke 8b at one side of the self-hold solenoid 8 is supported by a determining pin, and the yoke 8a at the other side thereof is fixed on a substrate of the drawer 20 by the screw 8j. An activating end 32a of a releasing spring 32 that is supported on the substrate of the drawer 20 by a screw 31 is latched to the connecting hole 8g of the moveable plate 8f. When the drawer 20 is open, the other end 32b of the releasing spring 32 becomes a free end, and when the drawer 20 is closed, the other end 32b is actuated by the end portion 21a of the chassis 21.

The number 33 is a lock lever, whose central portion is swingably supported by a screw 34. A front end 33a of the lock lever 33 is always in contact with the tip of the moveable plate 8f of the self-hold solenoid 8 by a resilient spring 35. A step portion 33b and an inclined portion 33c are formed on a rear end of the lock lever 33, and they are engaged with a lock pin 37 that is hung down from the chassis 21 and is fixed inside.

The number 38 represents a pressing mechanism of the drawer 20. When the drawer 20 is closed, a rear end of the pressing mechanism 38 is in contact with a tip 39a of a pressing lever 39, and with further pushing in of the drawer 20, the drawer 20 is pressed forward due to a resilient force of a coil spring 40 hung between the pressing lever 39 and the chassis 21.

Figure 6:
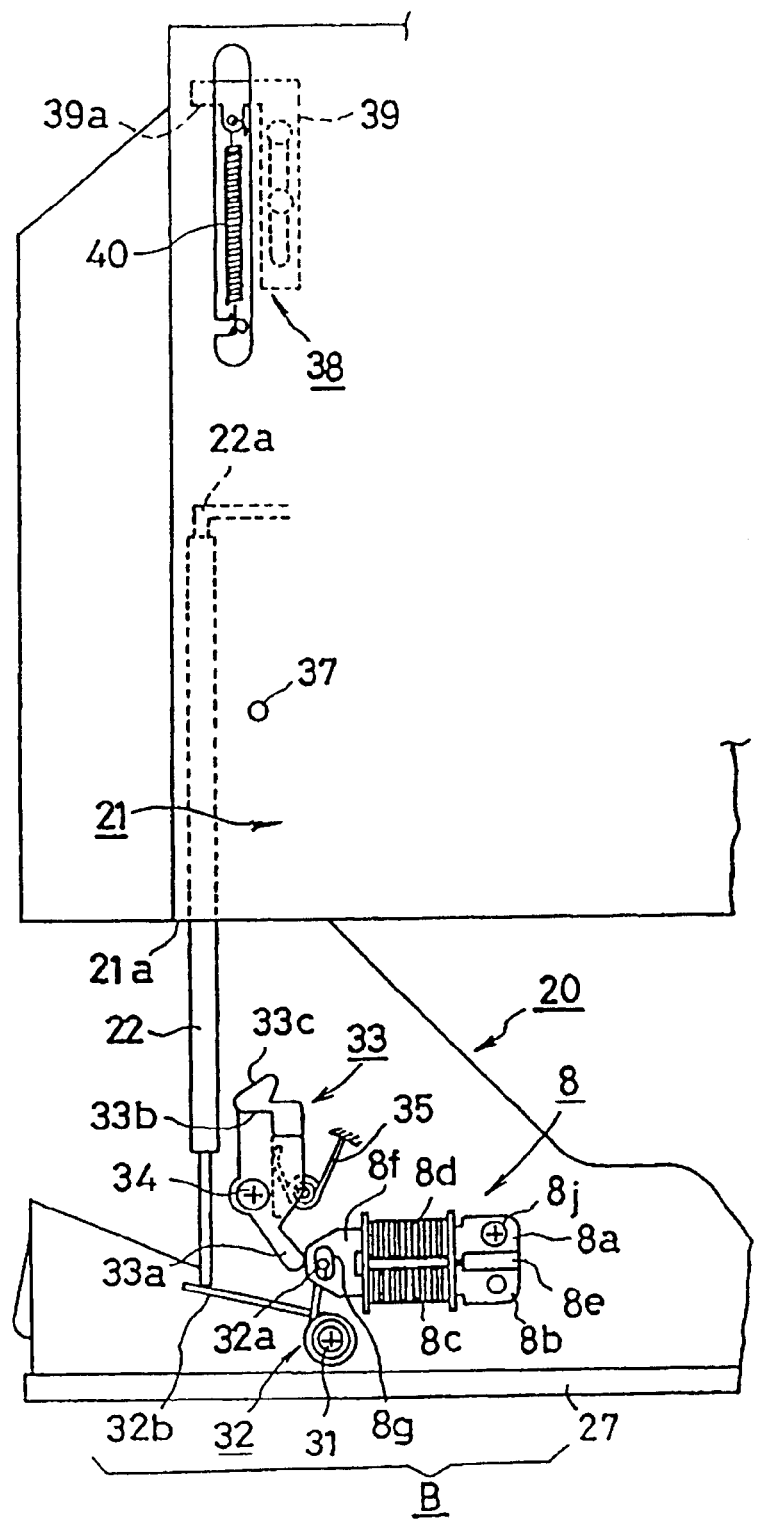
FIG. 6 shows the first operation step according to the second embodiment of the present invention.

The drawer 20 with the eject/lock mechanism B described as the second embodiment is shown in FIG. 6. When the drawer 20 is opened from a body of a PC, the free end 32b of the releasing spring 32 is not actuated, and no resilient force will be generated by the releasing spring 32, it is therefore in a condition of force-releasing.

Figure 7:
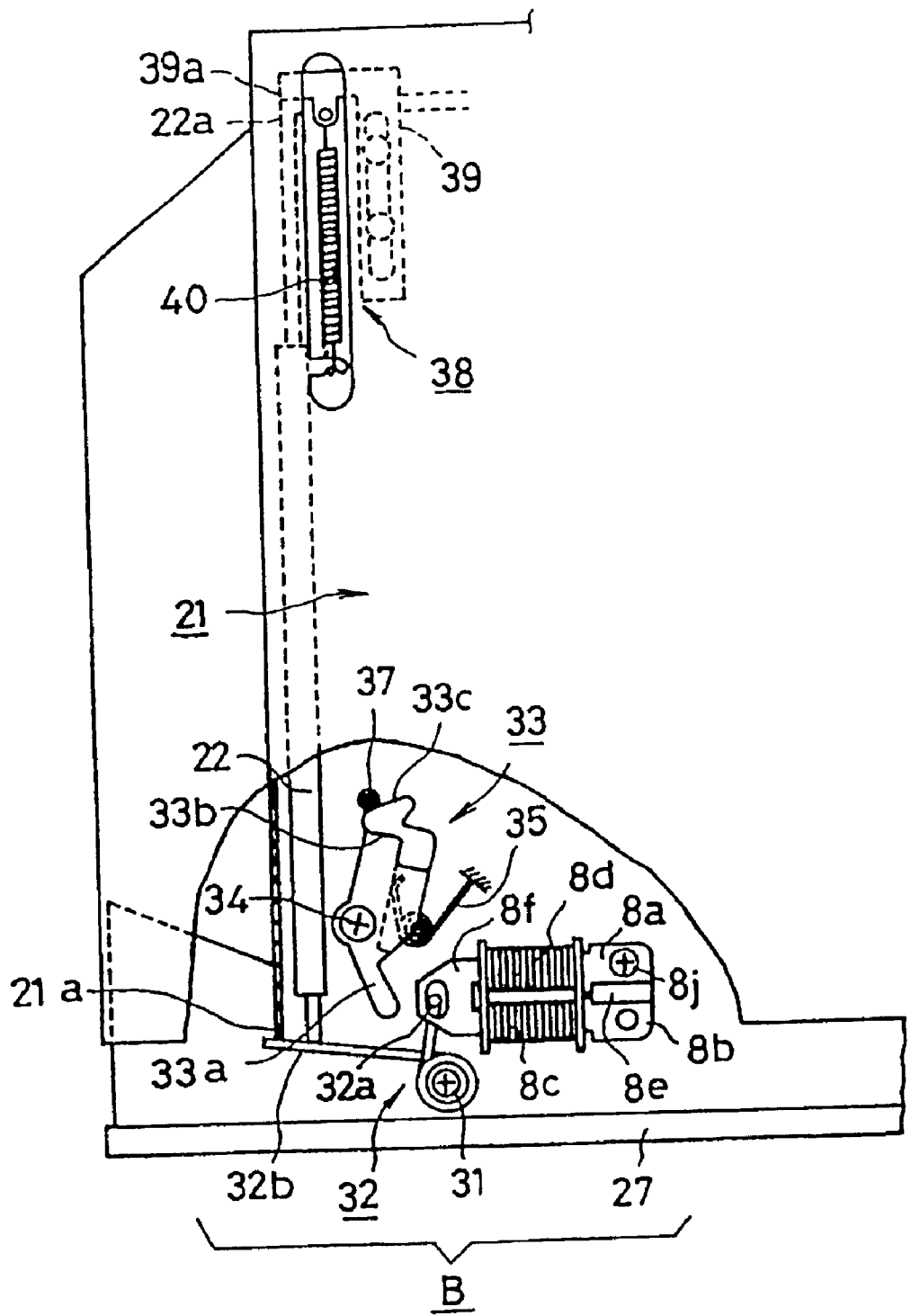
FIG. 7 shows the second operation step according to the second embodiment of the present invention.
Figure 8:
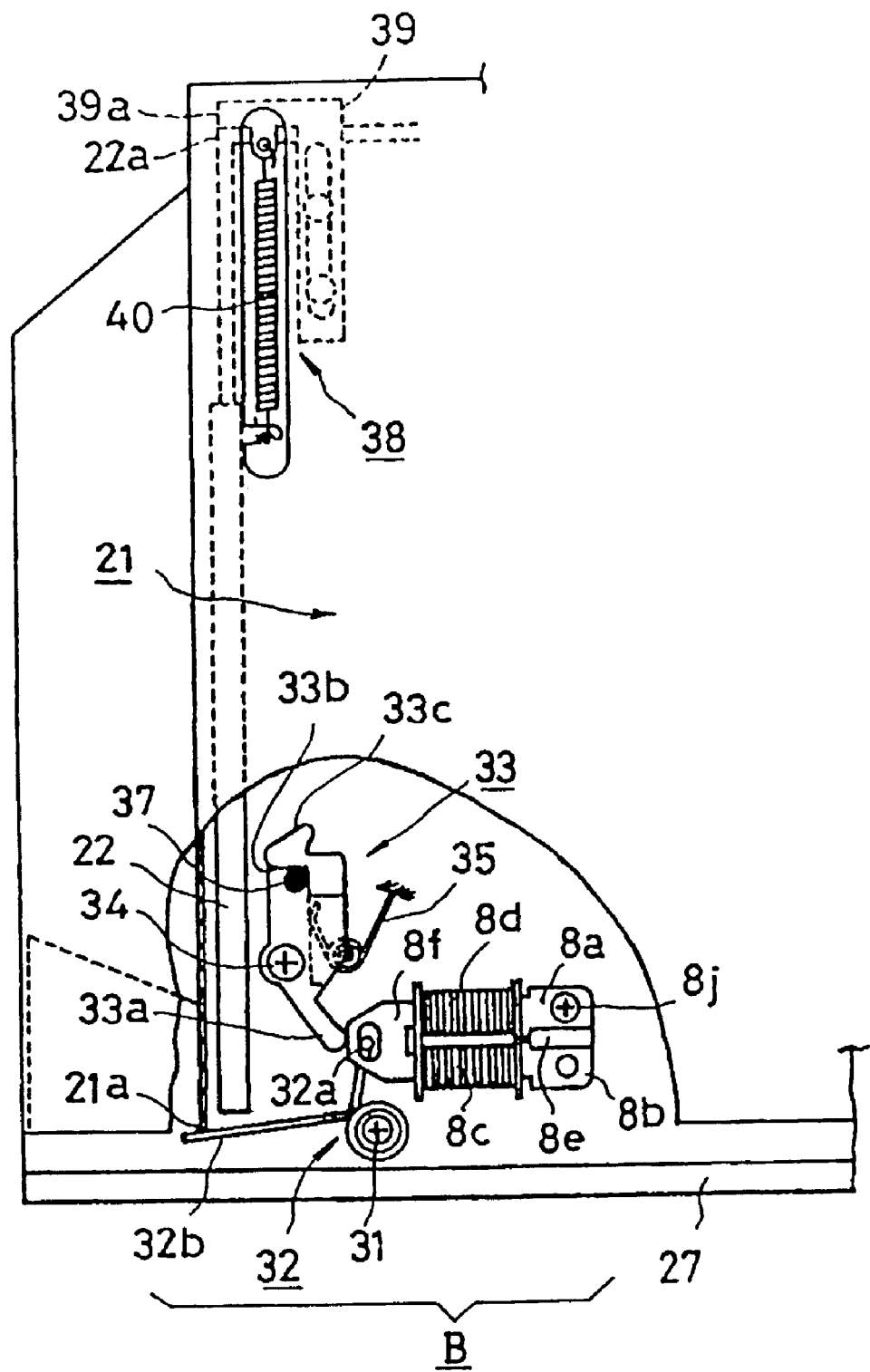
FIG. 8 shows the third operation step according to the second embodiment of the present invention.

When loading a disc on the disc-loading unit 23 and receiving the drawing 20 on the chassis 21, the drawer 20 is moved backward by manual power. When the drawer 20 is moving backward, as shown in FIG. 7, and when the inclined portion 33c of the lock lever 33 is in contact with the lock pin 37, the lock lever 33 will swing in order. And when the drawer 20 is further backed in, the lock pin 37 will engage the step portion 33b of the lock lever 33 as shown in FIG. 8, then complete locking the drawer 20.

At this time, the free end 32b of the releasing spring 32 is in contact with the end portion 21a of the chassis 21 to generate a resilient force. When in this condition, even though the activating end 32a of the releasing spring 32 acts in the direction that pulls out the moveable plate 8f of the self-hold solenoid 8, the resilient force is set smaller than a magnetic force with which the self-hold solenoid 8 can attract and hold the moveable plate 8f. Therefore, the movable plate 8f can be maintained to be held by the self-hold solenoid 8. At this time, the resilient force of the releasing spring 32 for pulling out the moveable plate 8f is larger than that of the resilient spring 35 acting on the lock lever 33. As described above, when the drawer 20 is locked, the rear end 22a of the drawer 20 will press the pressing lever 39 of the pressing mechanism 38. In this way, the coil spring 40 will generate a resilient force that makes the drawer 20 go forward.

Figure 9:
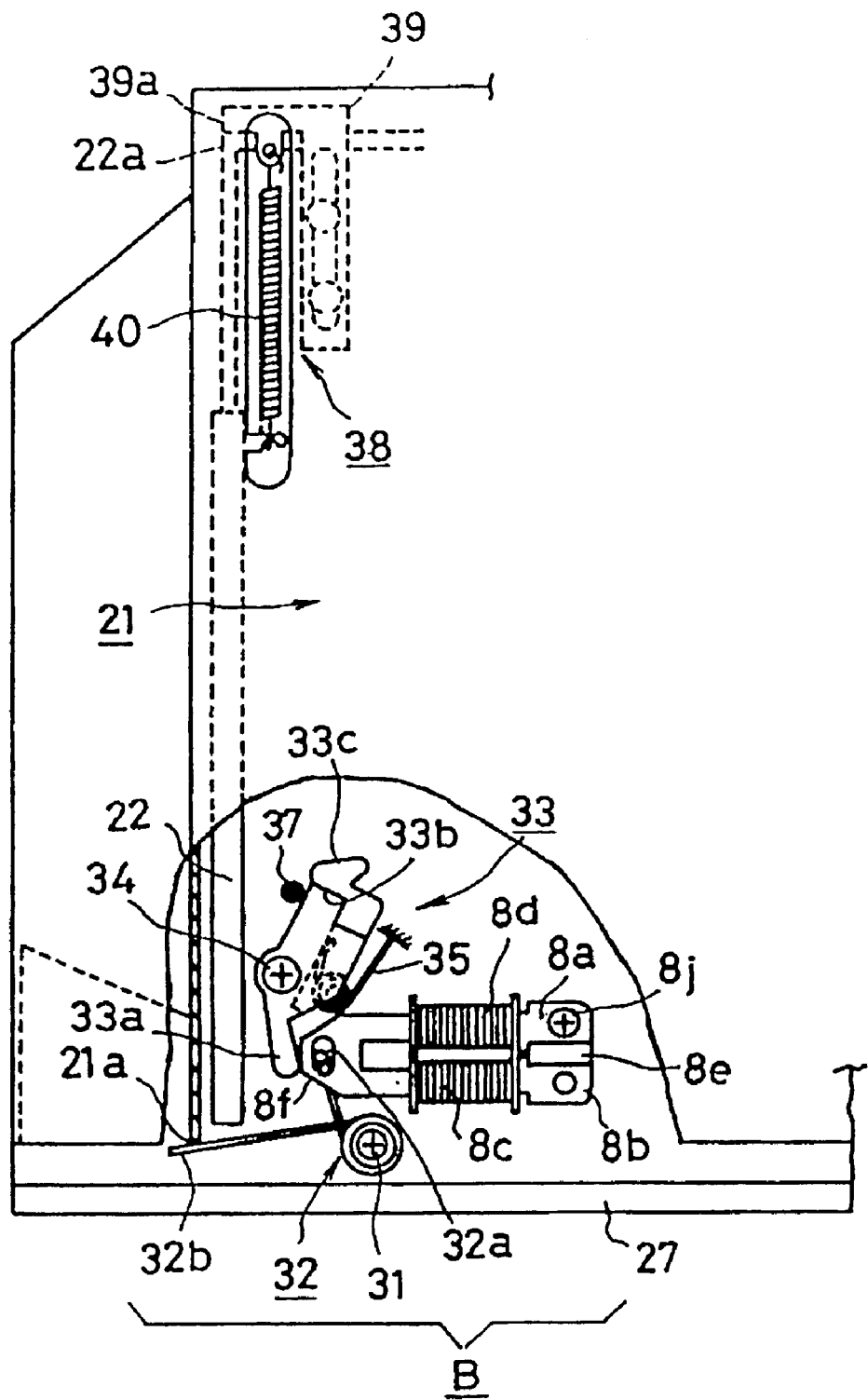
FIG. 9 shows the fourth operation step according to the second embodiment of the present invention.

When the drawer 20 is instructed to eject from the locked condition to open the drawer 20, a pulse current is applied to the magnetization coils 8c, 8d of the self-hold solenoid 8 according to the operation of the ejecting switch 28 or a command from the PC. Then, the magnetic field on the yokes 8a, 8b is eliminated by the magnetic field generated by the magnetization coils 8c, 8d, and therefore, the attracting force of the moveable plate 8f becomes instantly smaller than the spring force of the releasing spring 32. The resilient force of the releasing spring 32 will act and the moveable plate 8f is slid in the pulling direction. Additionally, the tip of the moveable plate 8f presses the tip 33a of the lock lever 33 to rotate the lock lever 33. Therefore, the engagement of the step portion 33 and the lock pin 37 is released as shown in FIG. 9. In this condition, the pressing lever 39 will act and push out the drawer 20 forward for a determined distance due to the resilient force of the coil spring 40. After that, the drawer 20 is manually moved forward, and then the disc-loading unit 23 is open.

By pushing out the drawer 20 forward to release the press of the free end 32b of the releasing spring 32 due to the end portion 21a of the chassis 21, the resilient force of the releasing spring 32 is released. Therefore, there is substantially no resilient force acting on the moveable plate 8f due to the releasing spring 32. The resilient force acting on the moveable plate 8f by the releasing spring 32 is smaller than that acting on the lock lever 33 by the resilient spring 35. In this way, the lock lever 33 will rotate counterclockwise due to the resilient force of the resilient spring 35. At this time, the lock lever 33 is pressed, and the moveable plate 8f slides in the attracting direction. In this way, the movable plate 8f can be attracted and held by the self-hold solenoid 8, returning to the condition in FIG. 6.

In the second embodiment, because the ejecting and locking mechanism can be constructed with only one lock lever, it can be easily disposed in a small space inside the disc device. In addition, because the structures are simplified, the main reasons of malfunction can be eliminated.

In the eject/lock mechanism described above, some of the mechanisms relating to ejecting can be omitted, resulting from using the releasing spring generating resilient force in the state of loading a disc. In this way, the structures can be simplified, the number of the parts can be reduced, the cost for the same mechanism can be lower, and a disc device with low malfunction frequency can be provided.

Additionally, according to the features of the present invention, after installing the eject/lock mechanism to the entity, the wiring process can be accomplished without difficulty by connecting the terminals of the self-hold solenoid to the substrate when installing the substrate. The rationality of the installing process is therefore improved.

While the present invention has been described with preferred embodiments, these descriptions are not intended to limit our invention. Various modifications of the embodiments will be apparent to those skilled in the art. It is therefore contemplated that the appended claims will cover any such modifications or embodiments as fall within the true scope of the invention.

What is claimed is:

1. A disc device, comprising:
   an eject/lock mechanism, activated by applying a pulse current to a self-hold solenoid, for opening a disc-loading unit; and
   a releasing spring, engaged with the eject/lock mechanism, for creating a resilient force when the disc-loading unit is closed, and for releasing the resilient force when the disc-loading unit is open; wherein an activating end of the releasing spring is connected to a moveable plate of the self-hold solenoid disc-loading unit.

2. The disc device of claim 1, wherein a terminal end of a magnetization coil of the self-hold solenoid is exposed to a circuit face of a printed board that covers the eject/lock mechanism, so that the terminal end is connected to a circuit of the printed board where the pulse current is applied.

3. The disc device of claim 2, wherein the printed board is disposed so as to support parts of the eject/lock mechanism.

4. A disc device, comprising:
an eject/lock mechanism, activated by applying a pulse current to a self-hold solenoid, for opening a disc-loading unit, wherein the eject/lock mechanism further comprises:
a first slider, having a releasing spring wherein the releasing spring is connected to a moveable plate of the self-hold solenoid for creating a resilient force by a first fixing claw of an upper lid when the upper lid of the disc-loading unit is closed, and for releasing the resilient force when the upper lid of the disc-loading unit is open; and
a second slider having a second fixing claw, wherein the second fixing claw engages the first fixing claw of the upper lid, and the second slider is actuated in a direction for maintaining an engagement of the second fixing claw, and then the engagement is released by moving the second slider together with the first slider.

5. The disc device of claim 4, wherein the resilient force of the releasing spring is smaller than a holding force of the moveable plate of the self-hold solenoid.

6. The disc device of claim 4, wherein a terminal end of a magnetization coil of the self-hold solenoid is exposed to a circuit face of a printed board that covers the eject/lock mechanism, so that the terminal end is connected to a circuit of the printed board where the pulse current is applied.

7. The disc device of claim 6, wherein the printed board is disposed so as to support parts of the eject/lock mechanism.

8. A disc device, comprising:
an eject/lock mechanism, activated by applying a pulse current to a self-hold solenoid, for opening a disc-loading unit, wherein the eject/lock mechanism further comprises:
a lock lever, having a latching unit, wherein the latching unit moves together with a moveable plate of the self-hold solenoid, and the latching unit is latched by a lock pin;
a releasing spring, for creating a resilient force by stretching the moveable plate of the self-hold solenoid when a drawer is closed, and for releasing the resilient force when the drawer is open.

9. The disc device of claim 8, wherein the resilient force of the releasing spring is smaller than a holding force of the moveable plate of the self-hold solenoid.

10. The disc device of claim 8, wherein a terminal end of a magnetization coil of the self-hold solenoid is exposed to a circuit face of a printed board that covers the eject/lock mechanism, so that the terminal end is connected to a circuit of the printed board where the pulse current is applied.

11. The disc device of claim 10, wherein the printed board is disposed so as to support parts of the eject/lock mechanism.

12. A disc device, comprising:
an eject/lock mechanism, activated by applying a pulse current to a self-hold solenoid, for opening a disc-loading unit, wherein a terminal end of a magnetization coil of the self-hold solenoid is exposed to a circuit face of a printed board that covers the eject/lock mechanism, so that the terminal end is connected to a circuit of the printed board where the pulse current is applied.

13. The disc device of claim 12, wherein the printed board is disposed so as to support parts of the eject/lock mechanism.

* * * * *